United States Patent
Gray et al.

(10) Patent No.: US 8,036,230 B2
(45) Date of Patent: Oct. 11, 2011

(54) SYSTEM AND METHOD FOR PROVIDING SINGLE IP TUNNEL

(75) Inventors: Richard L. Gray, Cary, NC (US); Chris O'Rourke, Apex, NC (US); Jayaraman R. Iyer, Sunnyvale, CA (US); Louis F. Menditto, Raleigh, NC (US); Humberto M. Tavares, Cary, NC (US); Biswaranjan Panda, Santa Clara, CA (US); Bhaskar Bhupalam, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 343 days.

(21) Appl. No.: 11/935,045

(22) Filed: Nov. 5, 2007

(65) Prior Publication Data

US 2009/0116513 A1    May 7, 2009

(51) Int. Cl.
*H04L 12/28* (2006.01)
*H04L 12/56* (2006.01)
*H04B 1/38* (2006.01)
*G06F 9/46* (2006.01)

(52) U.S. Cl. ........ 370/400; 370/351; 370/389; 455/560; 718/105

(58) Field of Classification Search .................. 370/389, 370/351, 400, 401; 718/105; 455/560
See application file for complete search history.

(56) References Cited

U.S. PATENT DOCUMENTS

| | | | |
|---|---|---|---|
| 5,920,705 A | 7/1999 | Lyon et al. | 395/200.7 |
| 6,049,893 A | 4/2000 | Liddell et al. | 714/23 |
| 6,170,068 B1 | 1/2001 | Liddell et al. | 714/49 |
| 2003/0198211 A1* | 10/2003 | Tsao | 370/349 |
| 2004/0003099 A1* | 1/2004 | House et al. | 709/229 |
| 2004/0162079 A1* | 8/2004 | Koshino et al. | 455/445 |
| 2004/0260800 A1 | 12/2004 | Gu et al. | 709/223 |
| 2004/0264481 A1* | 12/2004 | Darling et al. | 370/401 |
| 2005/0086319 A1* | 4/2005 | Makinen et al. | 709/213 |
| 2006/0072480 A1 | 4/2006 | Deval et al. | 370/254 |
| 2006/0133315 A1* | 6/2006 | Eriksson et al. | 370/331 |
| 2006/0195898 A1* | 8/2006 | Blicker | 726/12 |
| 2006/0291434 A1 | 12/2006 | Gu et al. | 370/338 |

* cited by examiner

*Primary Examiner* — Ayaz Sheikh
*Assistant Examiner* — Tarell Hampton
(74) *Attorney, Agent, or Firm* — Baker Botts L.L.P.

(57) ABSTRACT

In one embodiment, a method includes receiving a packet at a network processor, and determining the packet is to be directed to a selected one of a plurality of traffic processors if a tunnel endpoint identifier of the packet is associated with a subscriber terminal. The method further includes determining that the packet is to be directed to the selected one of the plurality of traffic processors if a destination address of the packet is associated with the subscriber terminal. The method still further includes distributing the packet to the selected one of the plurality of traffic processors.

21 Claims, 2 Drawing Sheets

US 8,036,230 B2

SYSTEM AND METHOD FOR PROVIDING SINGLE IP TUNNEL

TECHNICAL FIELD

This invention relates in general to communications, and, more particularly, to a system and method for providing a single IP tunnel for a network element having multiple processors.

BACKGROUND

Processor systems have grown in complexity and sophistication in recent years. Network operators are seeking next-generation solutions, which have increased performance. Such performance enhancements may include additional features and faster speeds, as well as improved manageability and reduced complexity. Increases in performance, in single processor systems, can be achieved without complicating management and adding complexity; this is achieved by upgrading systems to run faster processors as new processors become available. While symmetric multiprocessing (SMP) processors can add more computing power in the way of instructions executed per second, these processors can still be bottlenecked by a single network input/output (IO) interface or by cache-contention when running advanced networking applications.

In many networking applications, relying solely on Moore's law for processor improvements has not kept pace with performance requirements. For these applications, additional scalability is often achieved by introducing loadbalancers that distribute load across multiple systems. A challenge with the multiple system approach is that each system needs its own network layer addressing, and each system must be managed independently, such as for configuration and monitoring.

BRIEF DESCRIPTION OF THE DRAWINGS

For a more complete understanding of the present invention and its advantages, reference is now made to the following description, taken in conjunction with the accompanying drawings, in which.

OVERVIEW

In accordance with one embodiment, a method includes receiving a packet at a network processor, and determining the packet is to be directed to a selected one of a plurality of traffic processors if a tunnel endpoint identifier of the packet is associated with a subscriber terminal. The method further includes determining that the packet is to be directed to the selected one of the plurality of traffic processors if a destination address of the packet is associated with the subscriber terminal. The method still further includes distributing the packet to the selected one of the plurality of traffic processors.

In accordance with another embodiment, an apparatus includes a plurality or traffic processors, and a network processor. The network processor is operable to receive a packet, and determine that the packet is to be directed to a selected one of the plurality of traffic processors if a tunnel endpoint identifier of the packet is associated with a subscriber terminal. The network processor is further operable to determine that the packet is to be directed to the selected one of the plurality of traffic processors if a destination address of the packet is associated with the subscriber terminal. The network processor is further operable to distribute the packet to the selected one of the plurality of traffic processors.

A technical advantage of one embodiment may be that a GGSN is provided that operates with a single IP address across an array of processors. This provides for a reduction in the number of addresses that must be managed by reducing the number of DNS entries and assigned subnets.

DETAILED DESCRIPTION OF THE DRAWINGS

Offering gateway GPRS support node (GGSN) service that accepts a tunnel on a Gn interface, and that sends raw user IP traffic on a Gi interface is difficult to virtualize on a single tunnel endpoint IP address. Presenting a single gateway IP address to a GPRS network from the Gi interface across a set of processors in such an environment is also difficult. Coordination of Gi and Gn packet delivery is challenging due to Gn setup exchange, both before and after address assignment. Embodiments of the present invention provide an approach to providing a single IP tunnel for a network element having multiple processors.

Figure 1:
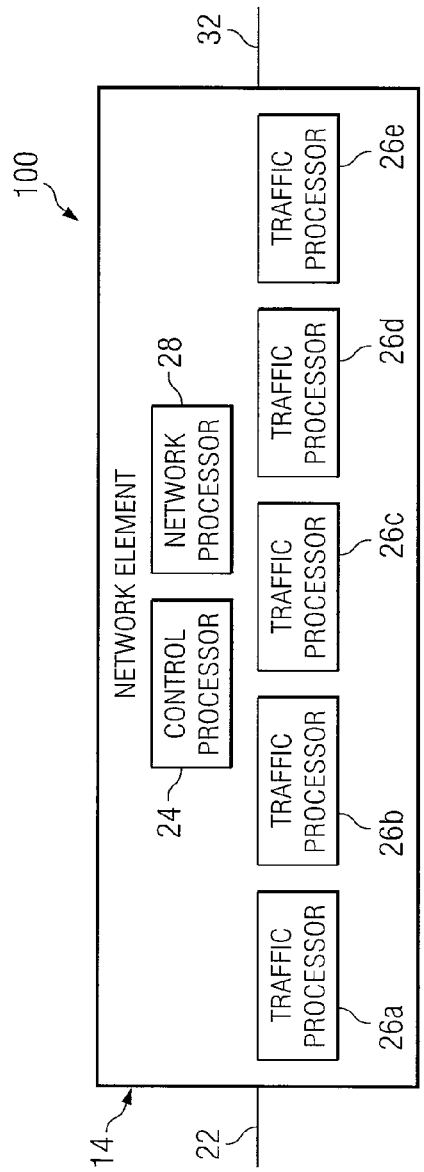
FIG. 1 is a simplified block diagram of a network element for providing a single IP tunnel for a network element having multiple processors in accordance with one embodiment.

FIG. 1 is a simplified block diagram of a system 100 for providing a single IP tunnel for a gateway GPRS support node (GGSN) having multiple processors in accordance with one example embodiment. System 100 includes a network element 14. The network element 14 includes a first network interface 22 and a second network interface 32 that provide an interface between the network element 14 and one or more communication networks to which the network element 14 is connected. The network element 14 further includes a control processor 24, a network processor 28, and an array of traffic processors 26a-26e. In various embodiments, the network processor 28 receives ingress packets from the network element 14 and distributes the ingress packets to either the control processor 24 or one or more of the traffic processors 26a-26e. In various embodiments, packets sent from the network element 14 are not required to pass through the network processor 28 or the control processor 24.

The control processor 24 maintains the presence of the network element 14 from a network layer (e.g., Layer 3) perspective such that a single IP address is associated with the network element 14. The control processor 24 can further function to inform the network processor 28 of the system's local addresses, as well as inform the network processor 28 of criteria for load balancing transit and application traffic from the traffic processors 26a-26e.

The traffic processors 26a-26e handle network traffic, such as subscriber traffic, that is transited through the network element 14. The traffic through the traffic processors 26a-26e is distributed among the traffic processors 26a-26e by the network processor 28. In some embodiments, the network processor 28 is an Internet Exchange Processor (IXP). In various embodiments, the network processor 28 further functions to forward non-subscriber traffic to the control processor 24.

In at least one embodiment, the network element 14 functions as a gateway between a subscriber network and a communication network. The network element 14 sends and receives tunneled traffic associated with one or more subscribers coupled to the subscriber network via the first network interface 22, and sends and receives non-tunneled traffic associated with one or more information providers coupled to the communication network via the second network interface 32. In at least one embodiment, packets sent between a particular subscriber and a particular information provider are exchanged through the network element 14. In at least one embodiment, the network element 14 is a node in a General Packet Radio Services (GPRS) network and comprises a Gateway GPRS Support Node (GGSN).

The tunneled traffic includes traffic that is received from, and transmitted to, a particular subscriber that is encapsulated prior to sending (using a tunneling protocol). A particular tunnel associated with the particular subscriber is identified using an associated tunnel endpoint identifier. The non-tunneled traffic includes traffic that is received from, and transmitted to, a particular information provider coupled to the network.

In accordance with some embodiments, the network processor 28 performs load balancing of subscriber traffic to a specific traffic processor 26a-26e using a tunnel endpoint identifier and assigned IP address associated with a subscriber. In at least one embodiment, tunneled traffic from a particular subscriber terminal is received at the first network interface 22 of the network element 14 and, further, is routed to a selected one of the traffic processors 26a-26e based on the tunnel endpoint identifier. Non-tunneled traffic having an assigned subscriber address associated with the particular subscriber is received at the second network interface 32 of the network element 14 and, further, is routed to the same selected one of the traffic processors 26a-26e based on the assigned subscriber address.

In at least one embodiment, the network processor 28 of the network element 14 includes a table that includes, for each subscriber, a first entry mapping a particular tunnel endpoint identifier to a particular traffic processor 26a-26e, and a second entry mapping a particular assigned subscriber address to the same traffic processor 26a-26e. When tunneled traffic from a particular subscriber terminal is received at the first network interface 22 of the network element 14, the network processor 28 performs a table lookup using the tunnel endpoint identifier to determine the particular traffic processor 26a-26e to which it should be routed. When non-tunneled traffic having an assigned subscriber address associated with the particular subscriber is received at the second network interface 32 of the network element 14, the network processor 28 performs a table lookup using the assigned subscriber address to route the non-tunneled traffic to a specific traffic processors 26a-26e.

Although the network element 14 is described as having one control processor 24, one network processor 28, and five traffic processors 26a-26e, it should be understood that the principles described herein can be applied to network elements having any number of the above-identified processors. In various embodiments, each of the control processor 24, the network processor 28, and the traffic processors 26a-26e is an independent processor that executes instructions in parallel with its own scheduler and its own memory.

Software and/or hardware may reside in network element 14 in order to achieve the teachings of the features of the present invention. Note that, due to their flexibility, these components may alternatively be equipped with (or include) any suitable component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structure of network element 14 in the context of system 100 and, accordingly, they should be construed as such.

It should be noted that the internal structure of the system of FIG. 1 is versatile and can be readily changed, modified, rearranged, or reconfigured in order to achieve its intended operations or additional operations. Additionally, any of the items within FIG. 1 may be combined, where appropriate, or replaced with other functional elements that are operable to achieve any of the operations described herein.

A component of system 100 may include any suitable arrangement of elements, for example, an interface, logic, memory, other suitable element, or a combination of any of the preceding. An interface receives input, sends output, processes the input and/or output, performs other suitable operation, or performs a combination of any of the preceding. An interface may comprise hardware and/or software.

Logic performs the operations of the component, for example, executes instructions to generate output from input. Logic may include hardware, software, other logic, or a combination of any of the preceding. Certain logic, such as a processor, may manage the operation of a component. Examples of a processor include one or more computers, one or more microprocessors, one or more applications, other logic, or a combination of any of the preceding.

A memory stores information. A memory may comprise computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), other computer-readable medium, or a combination of any of the preceding.

Figure 2:
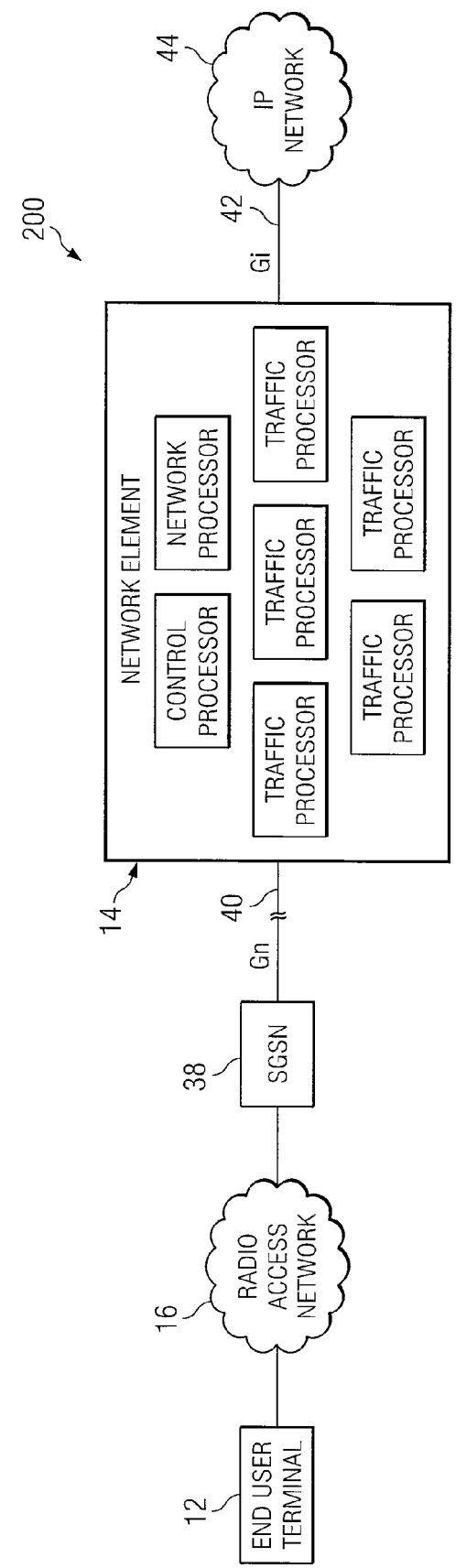
FIG. 2 is a simplified block diagram of an embodiment of a communication system including the network element of FIG. 1.

FIG. 2 simplified block diagram of an embodiment of a communication system 200 including the network element 14 of FIG. 1. In the particular embodiment of FIG. 2, the network element 14 comprises a GGSN. The communication system 100 further includes an end user terminal 12, a radio access network (RAN) 16, a serving general packet radio service (GPRS) support node (SGSN) 38, and an IP network 44. In at least one embodiment, the network element 14 is represented to the rest of the communication system 200 by a single IP address.

Communication system 200 may be generally configured or arranged to represent a 2.5 G communication architecture applicable to a Global System for Mobile (GSM) environment in accordance with a particular embodiment. Communication system 200 may also be configured to reflect a version of any suitable GPRS tunneling protocol. Communication system 200 may additionally cooperate with first generation, 2G, and 3G architectures that provide some configuration for allocating data to an end user in a network environment. Communication system 200 may also be employed in any other suitable communication architecture that seeks to allocate or otherwise manage data or information in a network environment. In another example, communications system 200 may cooperate with the Point-to-Point Protocol (PPP).

The user of the end user terminal 12 is a subscriber, client, customer, entity, source, or object seeking to initiate network communication in communication system 200 via IP network 44. End user terminal 12 may be inclusive of devices used to initiate a communication, such as a computer, a personal digital assistant (PDA), a laptop or an electronic notebook, a telephone, a mobile station, or any other device, component, element, or object capable of initiating voice or data exchanges within communication system 200. End user terminal 12 may also be inclusive of a suitable interface to the human user, such as a microphone, a display, a keyboard, or other terminal equipment (such as for example an interface to a personal computer or to a facsimile machine in cases where end user terminal 12 is used as a modem). End user terminal 12 may also be any device that seeks to initiate a communication on behalf of another entity or element, such as a program, a database, or any other component, device, element, or object capable of initiating a voice or a data exchange within communication system 200. Data, as used herein in this document, refers to any type of packet, numeric, voice, video, graphic, or script data, or any type of source or object code, or any other suitable information in any appropriate format that may be communicated from one point to another.

RAN 16 is a communications interface between end user terminal 12 and SGSN 38. RAN 16 may comprise a base transceiver station and a base station controller in one embodiment. The communications interface provided by RAN 16 may allow data to be exchanged between end user terminal 12 and any number of selected elements within communication system 300. RAN 16 may facilitate the delivery of a request packet generated by end user terminal 12 and the reception of information sought by end user terminal 12. RAN 16 is only one example of a communications interface between end user terminal 12 and SGSN 38. Other suitable types of communications interfaces may be used for any appropriate network design and be based on specific communications architectures in accordance with particular needs.

SGSN 38 and network element 14 (operating as a GGSN) are communication nodes or elements that cooperate in order to facilitate a communication session involving end user terminal 12. A GGSN is a communications node operating in a GPRS environment that may be working in conjunction with SGSN 38 to provide a communications medium in a GPRS service network. A GGSN may be inclusive of a walled garden (providing a security or access functionality to communication system 200) or any other suitable mechanism that a network operator may choose to implement in providing some connectivity for a network. GPRS represents a packet-based data bearer service for communication services that may be delivered as a network overlay for any type of suitable network configuration or platform. GPRS may support multiple internet communication protocols and may enable existing IP, point-to-point protocol (PPP), or any other suitable applications or platforms to operate over a given network.

IP network 44 represents a series of points or nodes of interconnected communication paths for receiving and transmitting packets of information that propagate through communication system 200. IP network 44 offers a communicative interface between end user terminal 12 and one or more information providers and may be any local area network (LAN), wireless local area network (WLAN), metropolitan area network (MAN), wide area network (WAN), virtual private network (VPN), or any other appropriate architecture or system that facilitates communications in a network environment. IP network 44 may implement a user datagram protocol (UDP)/internet protocol (UDP/IP) connection and use a transmission control protocol (TCP/IP) communication language protocol in particular embodiments. However, IP network 44 may alternatively implement any other suitable communication protocol for transmitting and receiving data packets within communication system 200.

The SGSN 38 can be coupled to the network element 14 via a Gn interface 40 in one scenario, or via other suitable interfaces based on particular architecture needs. In one embodiment, traffic sent between SGSN 38 and network element 14 is tunneled over the Gn interface 40 using a tunneling protocol. In a particular embodiment, the Gn traffic is tunneled using a GPRS Tunnelling Protocol (GTP) over IP, but could readily be replaced with other tunneling protocols. When the end user terminal 12 signs on and a tunnel, also referred to as packet data protocol (PDP) context, is established from the network element 14, a tunnel endpoint identifier (TEID) is assigned to the tunnel. The TEID is unique for all traffic coming to, and from, the end user terminal 12 over that PDP context. Traffic from the SGSN 38 to the network element 14 originating from the end user terminal 12 and destined for the IP network 44 has a destination IP address associated with the network element 14, a source IP address associated with the SGSN 38, and a tunnel endpoint identifier associated with the end user terminal 12. The network processor routes the traffic from the SGSN 38 through a selected traffic processor 26a-26e based on the TEID associated with the end user terminal 12.

The network element 14 is further coupled to the IP network 44 via a Gi interface 42 in this example scenario. Traffic from the IP network 44 to the network element 14 destined for the end user terminal 12 has a source IP address associated with the IP network 44 and a destination IP address associated with the end user terminal 12. The network processor routes traffic from the IP network 44 to the same selected traffic processor 26a-26e based on the destination IP address associated with the end user terminal 12.

Accordingly, loadbalancing of traffic (to ensure that the same traffic processor 26a-26e handles traffic to and from a particular end user terminal) is achieved by loadbalancing based on the TEID on the Gn interface 40, and/or loadbalancing based on the assigned subscriber IP address on the Gi interface 42. In accordance with various embodiments, the table entries associated with a particular TEID and subscriber IP address are periodically updated or removed when the associated PDP context is closed.

Certain embodiments provide for using a network processor 28 to persistently loadbalance PDP signalling to a single traffic processor 26a-26e by monitoring a GTP tunnel identifier and an assigned IP address. The assigned IP address is mapped directly to the same traffic processor on the Gi side for the duration of the PDP context. Certain embodiments provide for a single IP presence by coordinating PDP signalling and tunnel endpoint management using loadbalancing in a network processor 28.

Although the present invention has been described in detail with reference to particular embodiments, system 200 may be extended to any scenario in which it is desirable to present a single network address to adjacent networks in a multiprocessor system. This may also be extended to any other network signaling protocols to achieve the teachings of the present invention. Moreover, significant flexibility is provided by system 200 in that any suitable one or more components may be replaced with other components that facilitate their operations, as outlined herein.

Figure 3:
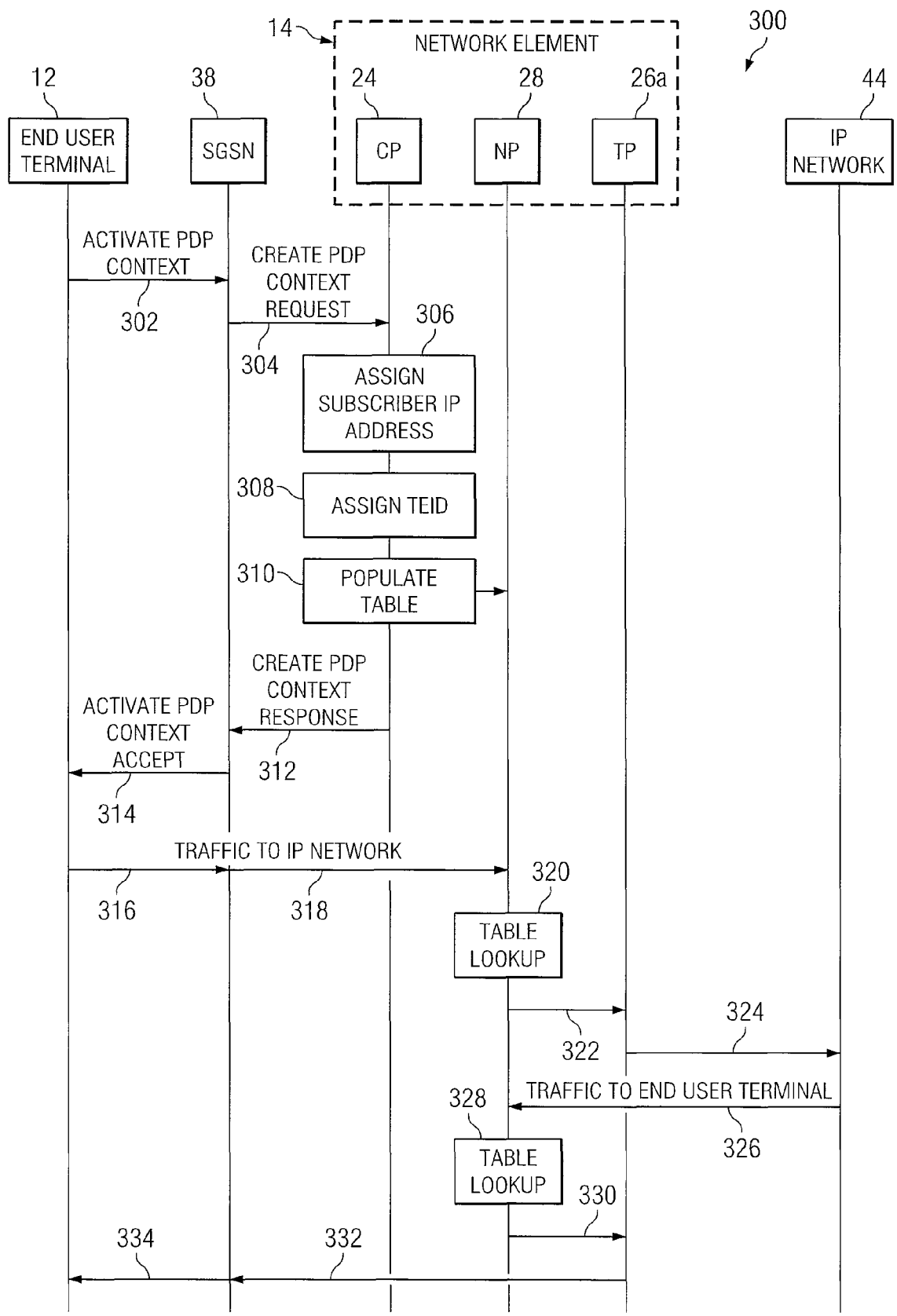
FIG. 3 is a simplified signaling diagram in accordance with one embodiment.

FIG. 3 is a simplified signaling diagram 300 in accordance with one embodiment. In the particular embodiment of FIG. 3, the network element 14 comprises a GGSN. In FIG. 3, an end user terminal 12 sends an activate PDP context message to SGSN 38 in step 302. In step 304, the SGSN 38 sends a create PDP context request message to the control processor 24 of network element 14. The control processor 24 of the network element 14 will then assign a subscriber IP address to the end user terminal 12 in step 306. In step 308, the control processor 24 will assign a TEID to the PDP context associated with the end user terminal 12. In step 310, the control processor 24 populates a table in the network processor 28 that includes a first entry mapping the TEID for the PDP context to traffic processor 26*a*, and a second entry mapping the assigned subscriber IP address associated with the end user terminal 12 to the same traffic processor 26*a*. For purposes of clarity, traffic processors 26*b*-26*e* are not shown in FIG. 3.

Until the table is populated by a particular TEID, packets coming to and from the network element 14 go to the control processor 24. After population of the table, packet traffic arriving at the network element 14 from the SGSN 38 having the particular TEID is routed to traffic processor 26*a*, and packet traffic arriving at the network element having a destination address of the assigned subscriber IP address is routed to the traffic processor 26*a*. In step 312, the control processor 24 sends a create PDP context response message to the SGSN 38. The SGSN 38 sends an activate PDP context accept message to the end user terminal 12 in step 314.

Subsequent to population of the table, the end user terminal 12 sends traffic addressed to IP network 44 to the SGSN 38 in step 316. The SGSN 38 encapsulates the traffic using a tunneling protocol having the TEID assigned to the PDP context and, further, sends the tunneled traffic to the GGSN in step 318. In step 320, the network processor 28 performs a table lookup of the TEID. The network processor 28 then routes the traffic to the traffic processor 26*a* based on the results of the table lookup. The traffic processor 26*a* then removes the tunnel from the traffic and sends the traffic to the IP network 44 in step 324.

In step 326, the IP network 44 sends traffic addressed to the end user terminal 12 to the network processor 28 of network element 14. In step 328, the network processor 28 performs a table lookup on the subscriber IP address associated with the end user terminal 12. In step 330, the network processor 28 then routes the traffic to the traffic processor 26*a* based on the results of the table lookup. In step 332, the traffic processor 26*a* encapsulates the traffic using a tunneling protocol and sends the traffic to the SGSN 38. The SGSN 38 then removes the encapsulation and sends the traffic to the end user terminal 12 in step 334. In accordance with various embodiments, the table entries associated with a particular TEID and subscriber IP address are removed when the associated PDP context is closed.

Some of the steps discussed with reference to FIG. 3 may be changed or deleted where appropriate and additional steps may also be added to these process flows. These changes may be based on specific communication architectures or particular interfacing arrangements and configurations of associated elements and do not depart from the scope or the teachings of the present invention.

Additionally, although described in specific environments and contexts, the present invention could be used in countless applications. Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method, comprising:
receiving a packet at a network element, the network element comprising a plurality of traffic processors corresponding to one Internet Protocol (IP) address, the network element comprising a table including a first entry and a second entry for each subscriber terminal of a plurality of subscriber terminals, the first entry mapping a tunnel endpoint identifier of the subscriber terminal to a particular traffic processor of the plurality of traffic processors, the second entry mapping a subscriber address of the subscriber terminal to the particular traffic processor;
if the packet is from a subscriber terminal and addressed to a network coupled to the network element, identifying a particular one of the plurality of traffic processors mapped to a tunnel endpoint identifier of the packet;
if the packet is to be directed to the subscriber terminal, identifying the particular one of the plurality of traffic processors mapped to a subscriber address of the packet, the subscriber address identifying the subscriber terminal; and
distributing the packet to the particular one of the plurality of traffic processors.

2. The method of claim 1, further comprising:
performing a table lookup on the tunnel endpoint identifier; and
determining the selected one of the plurality of traffic processors based on a result of the table lookup.

3. The method of claim 1, further comprising:
performing a table lookup on the destination address; and
determining the selected one of the plurality of traffic processors based on a result of the table lookup.

4. The method of claim 1, wherein the packet is part of traffic from the subscriber terminal to a network, the packet having a tunnel endpoint identifier associated with the subscriber terminal.

5. The method of claim 1, wherein the packet is part of traffic from a network to the subscriber terminal, the packet having a destination address associated with the subscriber terminal.

6. The method of claim 1, further comprising forwarding the packet from the selected one of the plurality of traffic processors to the subscriber terminal.

7. The method of claim 1, further comprising forwarding the packet from the selected one of the plurality of traffic processors to a network.

8. The method of claim 1, further comprising presenting a single network layer address for a network element to adjacent networks.

9. The method of claim 1, wherein at least a portion of incoming traffic is loadbalanced amongst the plurality of traffic processors.

10. An apparatus, comprising:
a plurality of traffic processors corresponding to one Internet Protocol (IP) address; and
a network processor operable to:
receive a packet;
search a table, the table including a first entry and a second entry for each subscriber terminal of a plurality of subscriber terminals, the first entry mapping a tunnel endpoint identifier of the subscriber terminal to a particular traffic processor of the plurality of traffic processors, the second entry mapping a subscriber address of the subscriber terminal to the particular traffic processor;

if the packet is from a subscriber terminal and addressed to a network coupled to the apparatus, identify a particular one of the plurality of traffic processors mapped to a tunnel endpoint identifier of the packet;

if the packet is to be directed to the subscriber terminal, identify the particular one of the plurality of traffic processors mapped to a subscriber address of the packet, the subscriber address identifying the subscriber terminal; and distribute the packet to the particular one of the plurality of traffic processors.

11. The apparatus of claim 10, wherein the network processor is further operable to:

perform a table lookup on the tunnel endpoint identifier; and determine the selected one of the plurality of traffic processors based on a result of the table lookup.

12. The apparatus of claim 10, wherein the network processor is further operable to:

perform a table lookup on the destination address; and determine the selected one of the plurality of traffic processors based on a result of the table lookup.

13. The apparatus of claim 10, wherein the packet is part of traffic from the subscriber terminal to a network, the packet having a tunnel endpoint identifier associated with the subscriber terminal.

14. The apparatus of claim 10, wherein the packet is part of traffic from a network to the subscriber terminal, the packet having a destination address associated with the subscriber terminal.

15. One or more non-transitory tangible media encoding logic, the logic when executed operable to:

receive a packet at a network element comprising a plurality of traffic processors associated with one Internet Protocol (IP) address;

search a table, the table including a first entry and a second entry for each subscriber terminal of a plurality of subscriber terminals, the first entry mapping a tunnel endpoint identifier of the subscriber terminal to a particular traffic processor of the plurality of traffic processors, the second entry mapping a subscriber address of the subscriber terminal to the particular traffic processor;

if the packet is from a subscriber terminal and addressed to a network coupled to the network element, identify a particular one of a plurality of traffic processors mapped to a tunnel endpoint identifier of the packet;

if the packet is to be directed to the subscriber terminal, identify the particular one of the plurality of traffic processors mapped to a subscriber address of the packet, the subscriber address identifying the subscriber terminal; and distribute the packet to the particular one of the plurality of traffic processors.

16. The logic of claim 15, further operable to:

perform a table lookup on the tunnel endpoint identifier; and determine the selected one of the plurality of traffic processors based on a result of the table lookup.

17. The logic of claim 15, further operable to:

perform a table lookup on the destination address; and determine the selected one of the plurality of traffic processors based on a result of the table lookup.

18. The logic of claim 15, wherein the packet is part of traffic from the subscriber terminal to a network, the packet having a tunnel endpoint identifier associated with the subscriber terminal.

19. The logic of claim 15, wherein the packet is part of traffic from a network to the subscriber terminal, the packet having a destination address associated with the subscriber terminal.

20. The logic of claim 15, further operable to forward the packet from the selected one of the plurality of traffic processors to the subscriber terminal.

21. The method of claim 1, further comprising:

removing the first entry and the second entry associated with the subscriber terminal from the table when a packet data protocol (PDP) context associated with the subscriber terminal is closed.

* * * * *